(12) United States Patent
Maurice

(10) Patent No.: US 9,370,911 B2
(45) Date of Patent: Jun. 21, 2016

(54) METHOD FOR MANUFACTURING A HEAD ASSEMBLY COMPRISING A TUBE HEAD AND A BARRIER INSERT

(71) Applicant: ALBEA SERVICES, Gennevilliers (FR)

(72) Inventor: Thierry Maurice, Châlons en Champagne (FR)

(73) Assignee: ALBEA SERVICES, Gennevilliers (FR)

( * ) Notice: Subject to any disclaimer, the term of this patent is extended or adjusted under 35 U.S.C. 154(b) by 40 days.

(21) Appl. No.: 13/954,975

(22) Filed: Jul. 30, 2013

(65) Prior Publication Data

US 2014/0034672 A1     Feb. 6, 2014

(30) Foreign Application Priority Data

Aug. 1, 2012   (EP) .................................... 12305948

(51) Int. Cl.
*B65B 7/00*      (2006.01)
*B32B 33/00*     (2006.01)
(Continued)

(52) U.S. Cl.
CPC ............ *B29D 99/0096* (2013.01); *B29D 23/20* (2013.01); *B65D 35/10* (2013.01);
(Continued)

(58) Field of Classification Search
CPC ........ B29C 65/00; B29C 65/02; B29C 65/44; B29C 65/48; B29C 65/4805; B29C 65/481; B29C 65/4815; B29C 65/70; B29C 66/00; B29C 66/01; B29C 66/02; B29C 66/024; B29C 66/0242; B29C 66/70; B29C 66/72; B29C 66/74; B29C 66/742; B29C 66/7422; B65D 35/10; B65D 35/12; B65D 35/14; B65D 35/16; B65D 35/44; B29L 2009/00; B29L 2009/003; B29L 2023/20; B29D 23/20; B32B 15/04; B32B 15/08
USPC ............... 156/60, 69, 90, 196, 212, 221, 222, 156/224, 242, 244.11, 244.12, 244.24, 245, 156/250, 252, 256, 293, 303.1, 308.2, 156/309.6; 222/92, 107
See application file for complete search history.

(56) References Cited

U.S. PATENT DOCUMENTS 3,260,411 A      7/1966 Dobson
4,132,331 A  *  1/1979 Magerle ........................ 222/107

FOREIGN PATENT DOCUMENTS

DE        102010038031 A1  *  4/2012

OTHER PUBLICATIONS

Material Safety Data Sheet for ALATHON® M5370. © 2014 LyondellBasell Industries Holdings, B.V. Retrieved from http://www.lyondellbasell.com/techlit/techlit/Hdpe/M5370.pdf.*

*Primary Examiner* — Philip Tucker
*Assistant Examiner* — Brian R Slawski
(74) *Attorney, Agent, or Firm* — Steven M. Greenberg, Esq.; CRGO Law

(57) ABSTRACT

The present invention relates to a method for manufacturing a head assembly comprising a tube head and a metal barrier insert, said method comprising steps of:
  providing a barrier insert comprising
    an intermediate metal layer being a disc having an inner opening, defining
    an upper surface, a lower surface, an inner edge and an outer edge,
    an upper layer made of plastic material covering said upper surface of the intermediate metal layer, and
    a lower layer made of plastic material covering said lower surface of the intermediate metal layer,
  heating at least one of said upper and lower layers, so that said upper or lower layer melts and the plastic material flows and covers at least the inner edge or the outer edge of the intermediate metal layer,
  attaching said barrier insert to the inner side of the shoulder of a plastic tube head.

11 Claims, 4 Drawing Sheets

Figure 1:
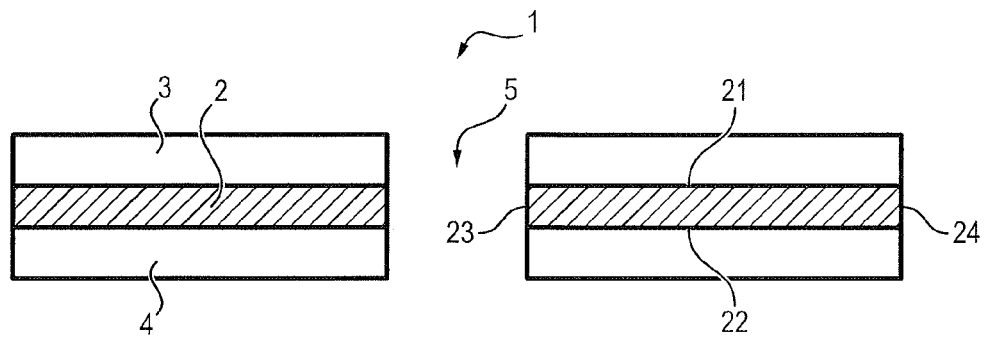

(51) Int. Cl.
| | |
|---|---|
| *B29C 51/14* | (2006.01) |
| *B29C 47/00* | (2006.01) |
| *B29C 65/00* | (2006.01) |
| *B32B 37/00* | (2006.01) |
| *B32B 38/04* | (2006.01) |
| *B65D 35/00* | (2006.01) |
| *B29D 99/00* | (2010.01) |
| *B29D 23/20* | (2006.01) |
| *B65D 35/16* | (2006.01) |
| *B65D 35/10* | (2006.01) |
| *B32B 15/08* | (2006.01) |
| *B32B 3/04* | (2006.01) |
| *B29C 65/48* | (2006.01) |
| *B29L 31/56* | (2006.01) |
| *B29C 65/02* | (2006.01) |

(52) U.S. Cl.
CPC ............... *B65D 35/16* (2013.01); *B29C 65/02* (2013.01); *B29C 65/48* (2013.01); *B29C 66/1122* (2013.01); *B29C 66/53245* (2013.01); *B29C 66/612* (2013.01); *B29C 66/71* (2013.01); *B29C 66/7234* (2013.01); *B29C 66/72321* (2013.01); *B29L 2031/565* (2013.01); *B32B 3/04* (2013.01); *B32B 15/08* (2013.01)

METHOD FOR MANUFACTURING A HEAD ASSEMBLY COMPRISING A TUBE HEAD AND A BARRIER INSERT

CROSS REFERENCE TO RELATED APPLICATIONS

This application claims priority under 35 U.S.C. §119(a) to European Patent Application Serial Number EP12305948.7, filed Aug. 1, 2012, entitled "IMPROVED METHOD FOR MANUFACTURING A HEAD ASSEMBLY COMPRISING A TUBE HEAD AND A BARRIER INSERT", the entire teachings of which are incorporated herein by reference.

BACKGROUND OF THE INVENTION

1. Technical Field

The present invention relates to tube packaging, and more precisely to a method for manufacturing an injection moulded tube head comprising a metal layer forming a bather, and a tube head formed by such a method.

2. Description of the Related Art

Tube packaging brings forward various technical issues depending on the product that is contained within the tube.

For instance, for highly corrosive products, or more generally for products that are susceptible to degrade a tube made of plastic material, the skirt comprises an intermediate metallic layer which exhibits barrier properties. As to the tube head which are conventionally made of plastic material, barrier inserts are known to provide such barrier properties to the tube head and enhance its resistance to products contained within the tube.

Such barrier inserts are conventionally made of a metallic intermediate layer, with its upper and lower sides covered by a plastic material. However, such barrier inserts exhibit weaknesses at the edges of the metallic intermediate layer, which can be corroded by the product contained in the tube if they are not properly covered.

Various solutions have been offered to avoid such corrosion of the intermediate layer, for instance document U.S. Pat. No. 3,260,411 discloses a tube head with a barrier insert, which is folded at its two edges to ensure that they are not in contact with the product contained within the tube. However, this folding of the barrier insert compromises its properties, and more specifically the barrier properties of the metallic intermediate layer.

The present invention therefore aims at providing a manufacturing method which does not present these issues.

SUMMARY OF THE INVENTION

The present invention presents a method for manufacturing a head assembly comprising a tube head and a metal barrier insert, said method comprising steps of:
  providing a barrier insert comprising
    an intermediate metal layer being a disc having an inner opening, defining an upper surface, a lower surface, an inner edge and an outer edge,
    an upper layer made of plastic material covering said upper surface of the intermediate metal layer, and
    a lower layer made of plastic material covering said lower surface of the intermediate metal layer,
  heating at least one of said upper and lower layers, so that said upper or lower layer melts and the plastic material flows and covers at least the inner edge or the outer edge of the intermediate metal layer,
  attaching said barrier insert to the inner side of the shoulder of a plastic tube head.

The invention also presents a method for manufacturing a head assembly comprising a tube head and a metal barrier insert, said method comprising steps of:
  providing a sheet of multi-layered material comprising
    an intermediate metal layer defining an upper surface, a lower surface,
    an upper layer made of plastic material covering said upper surface of the intermediate metal layer,
    a lower layer made of plastic material covering said lower surface of the intermediate metal layer,
    at least one opening defining an inner edge
  heating at least one of said upper and lower layers, so that said upper or lower layer melts and the plastic material flows and covers the inner edge of the intermediate metal layer,
  processing said sheet of multi-layered material in order to form an outer edge, thereby defining a barrier insert,
  heating at least one of said upper and lower layers, so that said upper or lower layer melts and the plastic material flows and covers the outer edge of the intermediate metal layer,
  attaching said barrier insert to the inner side of the shoulder of a plastic tube head.

According to various embodiments, said method can include one or more of the following features:
  both upper and lower layers are heated so that they both melt and both the inner edge and the outer edge of the intermediate metal layer are covered by plastic material;
  said intermediate metal layer is bonded to said inner and outer layers by adhesion layers located between said intermediate metal layer and said upper plastic layer, and between said intermediate metal layer and said lower plastic layer;
  said heating step is followed by a cooling step to stop the flow of the plastic material once said at least one edge is covered by plastic material;
  said method comprises a step of making said barrier insert in a conical shape after the heating step, and prior to the sealing step,
  said sealing to the tube head is made by overmoulding said tube head on said barrier insert, or said sealing to the tube head is made by bonding said barrier insert on a preformed tube head,
  said tube head is made by injection moulding or by compression moulding.

In an alternate embodiment, the method comprises a further step of associating a protective film to the barrier insert prior to its attachment to the tube head, said protective film covering the edges of the barrier insert. Said protective film is for instance a multi-layered film comprising outer layers of polyethylene and an inner layer of Ethylene Vinyl Alcohol.

In another alternate embodiment, the method comprises a further step of applying a layer of protective varnish on the edges of the barrier insert after the heating step and prior to any assembly.

The invention also relates to an assembly comprising a tube head and a barrier insert sealed to said tube head, said barrier insert comprising
  an intermediate metal layer being a disc with an inner opening, defining an upper surface, a lower surface, an inner edge and an outer edge,
  an upper plastic layer covering said upper surface of the intermediate metal layer, and
  a lower plastic layer covering said lower surface of the intermediate metal layer said assembly being characterized in that it is obtained by a method which comprises heating at least said upper or lower layer so that its plastic material melts and covers at least said inner or outer edge of the intermediate metal layer prior to the sealing of said barrier insert to the tube head.

According to a specific embodiment, said upper and lower plastic layers are made of the same or a different plastic material as the tube head.

According to another variant of the invention, both inner and outer edges of the intermediate metal layer are covered through melting of said upper and lower layers.

PRESENTATION OF THE DRAWINGS

Figure 2:
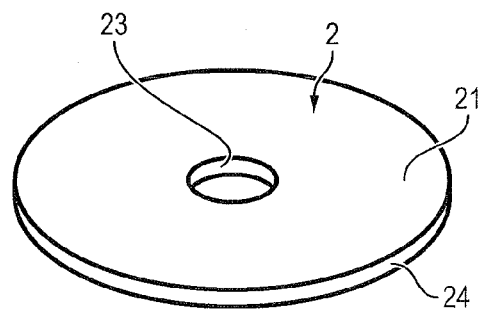
Figure 3:
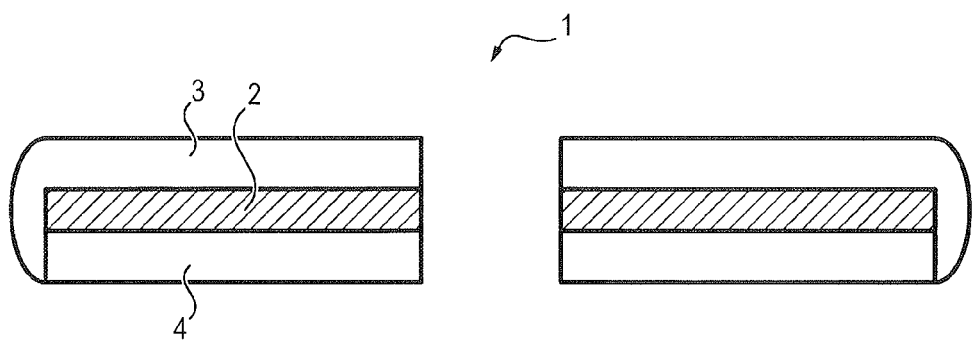
Figure 4:
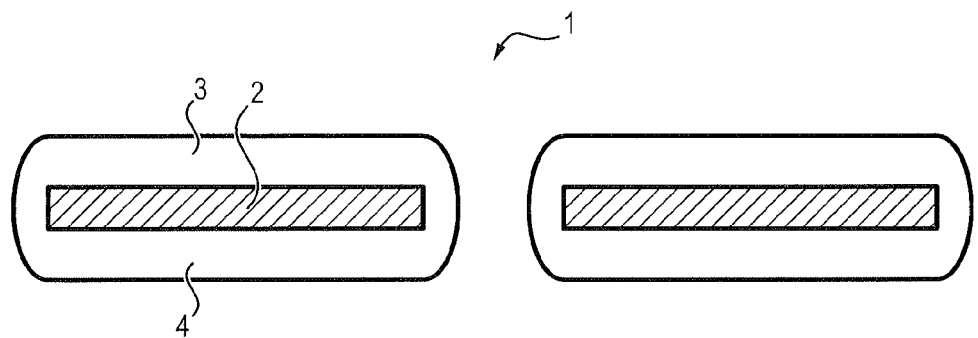
Figure 5:
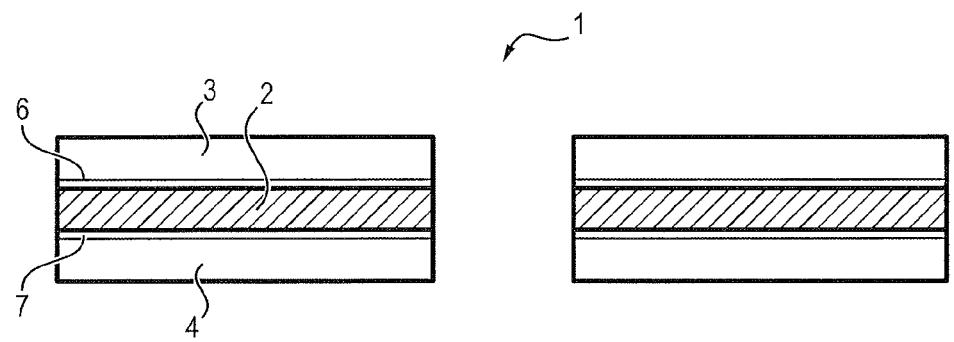
Figure 6:
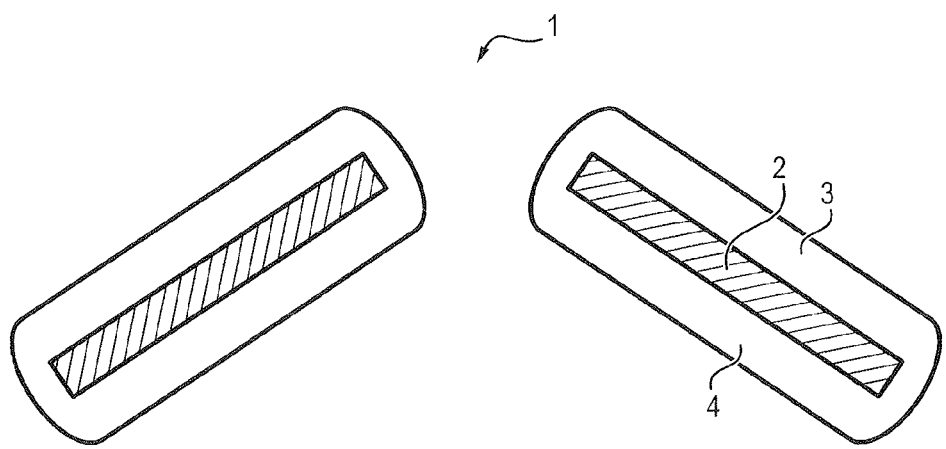
Figure 7:
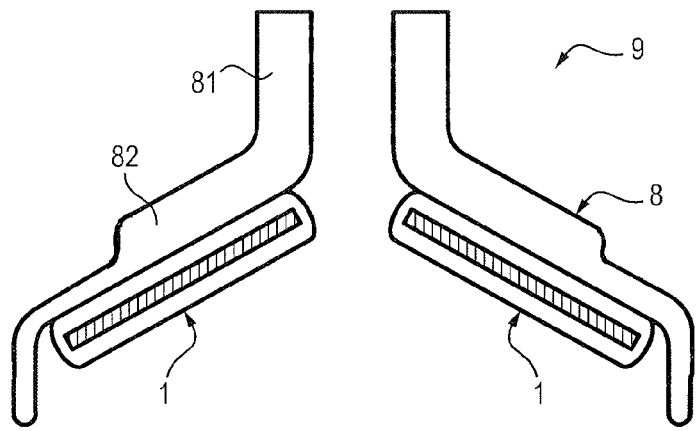
Figure 8:
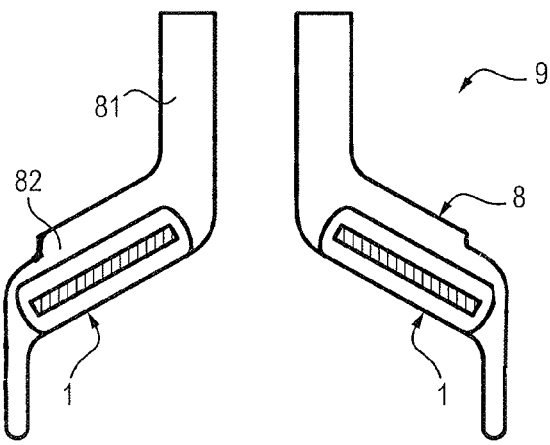
Figure 9:
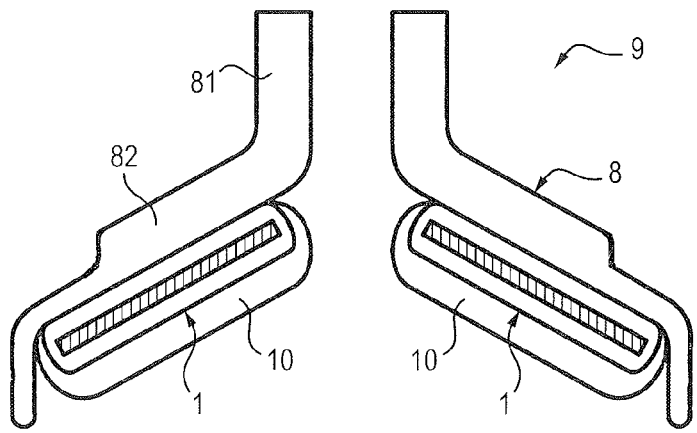
Figure 10:
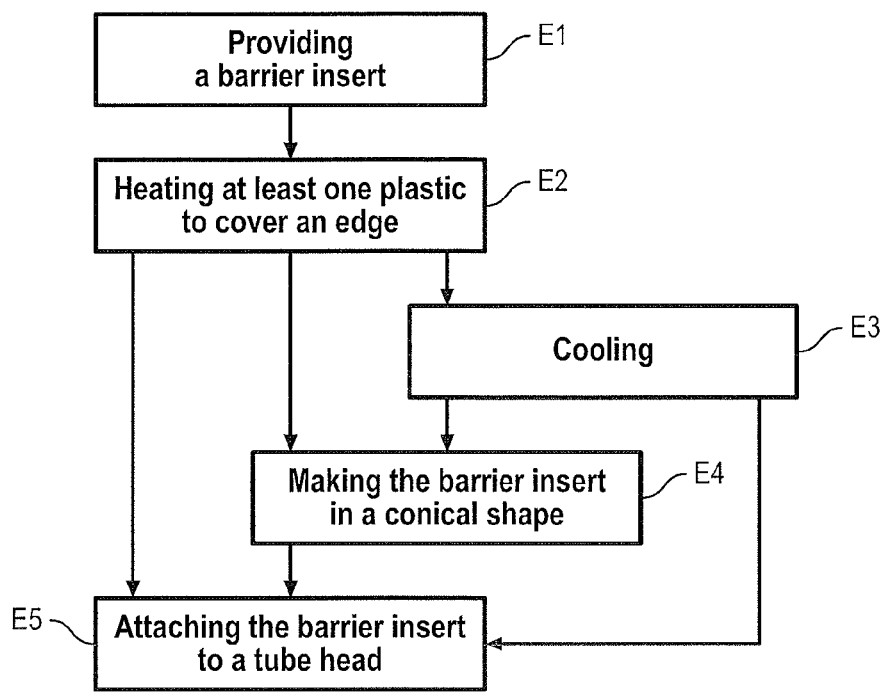

Other features and advantages of the invention will be detailed in the following description, which is purely illustrative and non-restrictive, and which is to be read in view of the following figures:

FIG. 1 discloses an example embodiment of a barrier insert according to an aspect of the invention;

FIG. 2 discloses an example of intermediate metal layer such a barrier insert;

FIGS. 3 and 4 disclose two examples of such an insert barrier after various heating steps;

FIG. 5 discloses another embodiment of a barrier layer according to an aspect of the invention;

FIG. 6 discloses a barrier layer which is made in a conical shape;

FIGS. 7 and 8 and 9 disclose three examples of sealing of a barrier insert to a tube head;

FIG. 10 discloses a method according to an aspect of the invention.

In the figures, similar elements are identified by common numerical references.

DETAILED DESCRIPTION

FIG. 1 discloses an example embodiment of a barrier insert 1 according to an aspect of the invention.

The barrier insert 1 as illustrated comprises an intermediate layer 2, which is made of a metallic material such as aluminium, and is shaped as a disc with an inner opening 5.

FIG. 2 illustrates the shape of this intermediate layer 2: a disc with an upper surface 21, a lower surface 22, an inner edge 23 and an outer edge 24.

The barrier insert 1 comprises an upper layer 3 which covers the upper surface 21 of the intermediate layer 2, and a lower layer 4 which covers the lower surface 22 of the intermediate layer 2. The inner edge 23 and outer edge 24 remain uncovered.

Said upper layer and lower layer are made of plastic material, for instance:
  polyethylene (PE), in any of its varieties such as high density polyethylene (HDPE), medium density polyethylene (MDPE), low density polyethylene (LDPE), linear low density polyethylene (LLDPE),
  polypropylene (PP),
  oriented polypropylene (oPP),
  oriented polyethylene (oPE),
  a plurality of layers made of any of the previously listed materials, or
  a blend.

As detailed previously, such a barrier insert can be inserted within a tube head of a tube container, in order to reinforce the barrier properties of said tube head.

However, such a barrier insert can be damaged, for instance due to the corrosion of the intermediate metal layer 2 by a product contained within a tube container which will reach the free edges 23 and 24 of said intermediate layer 2.

The method according to an aspect of the invention for forming an assembly comprising a tube head and a barrier insert therefore comprises a heating step, where at least one of the upper layer 3 and the lower layer 4 is heated so that the plastic material of said at least one layer at least partially melts, and covers at least one of the free edges 23 and 24 of the intermediate layer 2.

The heating can be performed for instance by induction heating.

In the example illustrated on FIG. 3, only the upper layer 3 is heated, so that its plastic material partially melts and covers the outer edge 24 of the intermediate layer.

The melting of the plastic material is controlled to ensure that the desired edge, in the present case the outer edge 24 of the intermediate layer 2 is fully covered by the plastic material, and that said melting of the plastic material does not uncover the upper or lower surface of the intermediate layer 2.

In the illustrated embodiment, the melting of the plastic material of the upper layer 3 covers the whole outer edge of the barrier insert 1, i.e. the outer edge of the intermediate layer 2 and of the lower layer 4, in addition to the outer edge of the upper layer which shape results from the melting of the plastic material.

In the present case, having the melt plastic material cover at least partially the lower layer 4 provides a better protection of the intermediate layer than having said melt plastic material stop strictly at the limit of the outer edge 24 of the intermediate layer 2.

An alternate embodiment is also possible where the inner edge 23 of the intermediate layer 2 is covered by melted plastic material, in a similar way as described for the outer edge 24 here before.

FIG. 4 illustrates another example of heating step, where both the upper and lower layers 3 and 4 are heated so that the plastic material that composes them at least partially melts, and covers both the inner and outer edges 23 and 24 of the intermediate layer 2.

Having the plastic material of both the upper and lower layers 3 and 4 melt enables to form a continuous coating around the intermediate layer, with the upper and lower layers 3 and 4 mixing at the edges of the intermediate layer 2, while having a single layer (either the upper layer 3 or the lower layer 4) heated will lead to a discontinuity at the junction of the melt plastic layer of the heated layer with the un-melt plastic layer of the other non-heated layer as illustrated in FIG. 3.

This embodiment where both the upper and lower layers 3 and 4 melt can also be applied in order to form a continuous coating over the inner edge 23 or the outer edge 24 or the intermediate layer 2, with the same advantage of not having a discontinuity at the junction of the melt and un-melt plastic.

The heating step can be followed by a cooling step, to stop the melting and the flowing of the plastic material of the at least one layer that is heated once the desired edge(s) is/are covered.

FIG. 5 illustrates another embodiment of a barrier layer 1 according to an aspect of the invention.

In this embodiment, the intermediate layer 2 is bonded to said inner and outer layers 3 and 4 by adhesion layers.

In the illustrated embodiment, an upper adhesion layer 6 is located between the intermediate layer 2 and the upper layer 3, and a lower adhesion layer 7 is located between the intermediate layer 2 and the lower layer 4.

These adhesion layers ensure a proper cohesion of the layers that constitute the barrier insert 1.

These adhesion layers are typically made any material that is adapted to ensure a proper cohesion between a layer made of metallic material and a layer made of plastic material, for instance Ethylene Acrylic Acid (EAA) such as sold under the trademark Primacor™ 3330. This type of structure can be used in the various embodiments of the method according to the invention.

FIG. 6 illustrates an example of barrier insert 1 which is made in a conical shape, for instance by a press.

This step of making the barrier insert 1 in a conical shape can be done prior to or after the heating step. It is conventionally performed to adapt the shape of the barrier insert to the shape of the tube head to which it will be attached.

FIGS. 7 and 8 illustrate two embodiments of a barrier insert 1 which is sealed to a tube head 8 in order to form a tube head assembly 9 for a tube packaging.

The tube head 8 as disclosed comprise a neck 81 and a shoulder 82.

The neck 81 forms the aperture of the tube head 8, and is typically adapted to cooperate with closing means.

The shoulder 82 is adapted to be linked to a tube skirt, which will form the tube packaging and contain a product.

The attachment of the barrier insert 1 to the shoulder 82 can be made in various ways.

FIG. 7 represents an example embodiment where the barrier insert 1 is attached to the tube head 8 after said tube head 8 is formed. The barrier insert 1 is for instance glued or welded to a tube head 8 that was formed independently from the barrier insert 1.

An example of process for performing this sealing step is disclosed in document WO 2009/157931, said process being adapted in view of the shape of the barrier insert 1, for instance if it is made directly with its inner opening 5.

The barrier insert 1 can be inserted in the tube head 8 by using a chuck or a press, which will conform the shape of the barrier insert 1 to the shape of the receiving surface of the tube head 8.

FIG. 8 represents another example embodiment where the tube head 8 is overmoulded on the barrier insert 1. This is achieved by instance by disposing the barrier insert 1 in an injection mould of the tube head 8, and then injecting the material for forming the tube head 8 in said mould. The barrier insert 1 will therefore be included and sealed in the structure of said tube head 8. The edges of the barrier insert are therefore also covered by the material forming the tube head, which provides an improved protection against corrosion of the metal layer.

The tube head 8 is made in plastic material, typically the same plastic material as the upper layer 3 and the lower layer 4 or a distinct plastic material.

The tube head 8 can be made by injection moulding, by compression moulding, or any other technique for manufacturing a tube head.

The determination of the layers that are heated and the edges that are covered through said heating of the upper and/or layer is made in view of the structure of the tube head to which the barrier insert is to be attached.

For instance, in the case of an attachment to a previously made tube head as illustrated in FIG. 7, both the inner edge 23 and the outer edge 24 of the intermediate layer 2 should be covered by plastic material, since the tube head 8 will not cover these edges. "Previously made tube head" means that the tube head is produced separately from the barrier insert, and before the attachment step with the barrier insert. The barrier insert 1 is then typically attached to the tube head via welding or gluing.

Turning now to FIG. 8, we can see that the barrier insert 1 is fully integrated in the structure of the tube head 8 due to the overmoulding of the tube head 8 on the barrier insert 1. Therefore, covering only one of the free edges of the intermediate layer 2 of the barrier insert 1 can be sufficient, for instance the inner edge 23 if the bather insert extends through all the width of the shoulder 82 of the tube head 8 and reaches the inner surface of the neck 81. The injection process realises at the same time the forming of the tube head 8 and the overmoulding of the insert 1. The insert 1 is then attached to the tube head 8 via the overmoulding.

FIG. 9 discloses a further embodiment of the invention, where protective film 10 is further associated to the barrier insert 1 in order to reinforce its barrier effect and prevent a migration of the product contained within the tube associated to the tube head through the plastic layers of the barrier insert 1.

This protective film 10 can be made from polyethylene (PE), Ethylene Vinyl Alcohol (EVOH) or a blend thereof. The protective film 10 is typically a three layered film, comprising two external layers of polyethylene, and an internal layer of Ethylene Vinyl Alcohol.

The film 10 is configured so that its association with the barrier insert covers both its inner and outer edges 23 and 24, prior or after to its attachment to a tube head.

This alternate embodiment therefore provides an additional cover layer on the edges of the intermediate layer of the barrier insert 1, which further prevents the risks of these edges to be in contact with the product contained within the tube.

Besides, the film 10 covers the inner surface of the barrier insert 1, which is directly exposed to the product contained within the tube. This additional layer therefore offers an additional protection to the barrier insert 1.

In the particular embodiment where the film 10 is a three layered film comprising two external layers of polyethylene, and an internal layer of Ethylene Vinyl Alcohol, a stronger bonding of these layers can be obtained relatively to the bonding of a polyethylene-Aluminium-polyethylene assembly from which the barrier insert 1 is typically made.

This particular embodiment therefore provides further enhances resistance of the assembly, by protecting the barrier insert with a weaker bonding by the film 10 which has strongly bonded layers.

In another embodiment, the invention comprises a further step of applying a layer of protective material such as varnish, wax or any other appropriate material on the inner and outer edges of the barrier insert 1.

In this embodiment, after the heating step where at least one of the upper and lower layers 3 and 4 is heated so that said upper and/or lower layer melts and the plastic material flows and covers at least the inner edge 23 or the outer edge 24 of the intermediate layer 2, a layer of varnish is applied in order to cover at least both the inner and outer edges of the barrier insert 1.

This additional varnish layer provides an improved protection to the intermediate layer 2 of the barrier insert 1, and ensures that the product contained within the tube does not reach it through the plastic material of the upper and lower layers 3 and 4.

This embodiment can be associated with the embodiment presented previously and illustrated on FIG. 9, thereby associating the protective effects of the varnish and of the protective film 10.

FIG. 10 discloses a method according to an aspect of the invention for manufacturing a tube head assembly 9 as presented previously.

This figure represents the steps in relation with the various stages of the method that were disclosed in the previous figures.

A first step E1 is to provide a barrier insert 1, for instance a barrier insert such as described in FIGS. 1 and 2, comprising:
- an intermediate layer 2 made of metallic material, being a disc having an inner opening 5, defining an upper surface 21, a lower surface 22, an inner edge 23 and an outer edge 24,
- an upper layer 3 made of plastic material covering said upper surface 21 of the intermediate layer 2, and
- a lower layer 4 made of plastic material covering said lower surface 22 of the intermediate layer 2.

In a second step E2, which will be referred to as "heating step", at least one of the upper and lower layers 3 and 4, so that said upper and/or lower layer melts and the plastic material flows and covers at least the inner edge 23 and/or the outer edge 24 of the intermediate layer 2.

Various embodiments are possible, such as the ones described in relation with FIGS. 3 and 4 detailed previously.

In an alternative embodiment steps E1 and E2 are replaced by a manufacturing step where a sheet of multi-layered material is provided, comprising an intermediate layer 2 made of metallic material, with both its upper and lower surfaces covered by plastic material, said sheet comprising at least one opening defining the central opening of barrier inserts and thereby defining inner edges 23. This sheet is then heated so that the plastic material covering either or both of said lower and/or upper surface melts and covers the inner edge 23 of the intermediate layer 2.

The resulting product is then processed through a die in order to form the outer periphery, which results in obtaining barrier inserts 1 with a disc shape as described previously and defines the outer edge 24 of the intermediate layer 2. These barrier inserts 1 are heated again so that the plastic material covering either or both of said lower and/or upper surface melts and covers the outer edge 24 of said intermediate layer 2 of the barrier inserts 1.

In an optional third step E3, which will be referred to as a "cooling step", the barrier insert 1 is cooled in order to stop the flow of the plastic material once the desired edges of the intermediate layer 2 are covered.

In another optional step E4, the barrier insert 1 is made in a conical shape, in order to be adapted to the shape of the tube head 8 to which the barrier insert 1 is to be attached in order to obtain the desired tube head assembly 9.

This optional step E4 can occur prior to the heating step E2, after said heating step E2, or after the cooling step 3.

The barrier insert 1 can be provided directly with a specific shape, in which case such a step is not required.

In a fifth step E5, which will be referred to the "attachment step", the barrier insert 1 is attached to the tube head 8 in order to form a tube head assembly 9 comprising a tube head and a barrier insert.

As detailed previously, various embodiments of this attachment step include welding or gluing the bather insert 1 to an independent tube head 8, or to overmould the tube head 8 on the bather insert 1.

The various embodiments described therefore provide a tube head assembly 9 comprising a tube head 8 and a barrier insert 1 which is protected from effect that could deteriorate its barrier properties.

The invention claimed is:

1. A method for manufacturing a head assembly comprising a tube head and a metal barrier insert, the method comprising:
   providing a barrier insert comprising:
      an intermediate metal layer being a disc having an inner opening, defining an upper surface, a lower surface, an inner edge and an outer edge,
      an upper layer made of plastic material covering said upper surface of the intermediate metal layer, and
      a lower layer made of plastic material covering said lower surface of the intermediate metal layer,
   heating at least one of said upper and lower layers, so that said upper or lower layer melts and the plastic material flows and covers at least the inner edge or the outer edge of the intermediate metal layer, and
   attaching said barrier insert to an inner side of a shoulder of a plastic tube head, the shoulder adapted to be linked to a tube skirt, the barrier insert being entirely covered by the inner side of the shoulder.

2. The method according to claim 1, wherein both upper and lower layers are heated so both layers melt and both the inner edge and the outer edge of the intermediate metal layer are covered by plastic material.

3. The method according to claim 1, wherein said intermediate metal layer is bonded to said upper and lower layers by adhesion layers located between said intermediate metal layer and said upper plastic layer, and between said intermediate metal layer and said lower plastic layer.

4. The method according to claim 1, wherein said heating step is followed by a cooling step to stop the flow of the plastic material once said at least one edge is covered by plastic material.

5. The method according to claim 1, comprising making said barrier insert in a conical shape after the heating step, and prior to sealing said barrier insert to the tube head.

6. The method according to claim 1, wherein said attachment to the tube head is made by overmoulding said tube head on said barrier insert.

7. The method according to claim 1, wherein said attachment to the tube head is made by bonding said barrier insert on a preformed tube head.

8. The method according to claim 1, further comprising the step of associating a protective film to the barrier insert, said protective film covering the edges of the barrier insert.

9. A method for manufacturing a head assembly comprising a tube head and a metal barrier insert, comprising:
   providing a sheet of multi-layered material comprising
      an intermediate metal layer defining an upper surface and a lower surface,
      an upper layer made of plastic material covering said upper surface of the intermediate metal layer,
      a lower layer made of plastic material covering said lower surface of the intermediate metal layer, and
      at least one opening defining an inner edge,
   heating at least one of said upper and lower layers, so that said upper or lower layer melts and the plastic material flows and covers the inner edge of the intermediate metal layer,
   processing said sheet of multi-layered material in order to form an outer edge, thereby defining a barrier insert,
   heating at least one of said upper and lower layers, so that said upper or lower layer melts and the plastic material flows and covers the outer edge of the intermediate metal layer, and
   attaching said barrier insert to an inner side of a shoulder of a plastic tube head, the shoulder adapted to be linked to a tube skirt, the barrier insert being entirely covered by the inner side of the shoulder.

10. A method for manufacturing a head assembly comprising a tube head and a metal barrier insert, the method comprising:
    providing a barrier insert comprising:
        an intermediate metal layer being a disc having an inner opening, defining an upper surface, a lower surface, an inner edge and an outer edge,
        an upper layer made of plastic material covering said upper surface of the intermediate metal layer, and
        a lower layer made of plastic material covering said lower surface of the intermediate metal layer,
    heating at least one of said upper and lower layers, so that said upper or lower layer melts and the plastic material flows and covers at least the inner edge or the outer edge of the intermediate metal layer, and
    attaching said barrier insert to an inner side of a shoulder of a plastic tube head, the shoulder adapted to be linked to a tube skirt, the barrier insert having a protective film associated therewith and covering the edges of the barrier insert, wherein said protective film is a multi-layered film comprising outer layers of polyethylene and an inner layer of ethylene vinyl alcohol.

11. A method for manufacturing a head assembly comprising a tube head and a metal barrier insert, the method comprising:
    providing a barrier insert comprising:
        an intermediate metal layer being a disc having an inner opening, defining an upper surface, a lower surface, an inner edge and an outer edge,
        an upper layer made of plastic material covering said upper surface of the intermediate metal layer, and
        a lower layer made of plastic material covering said lower surface of the intermediate metal layer,
    heating at least one of said upper and lower layers, so that said upper or lower layer melts and the plastic material flows and covers at least the inner edge or the outer edge of the intermediate metal layer, and
    attaching said barrier insert to an inner side of a shoulder of a plastic tube head, the shoulder adapted to be linked to a tube skirt, the attaching further comprising applying a layer of protective varnish on the edges of the barrier insert after the heating step and prior to any assembly.

\* \* \* \* \*